United States Patent [19]

Atkins et al.

[11] 3,923,928

[45] Dec. 2, 1975

[54] UNSATURATED POLYESTERS AND COMPOSITIONS BASED THEREON

[75] Inventors: Kenneth E. Atkins, South Charleston; Michael A. Harpold, St. Albans; Percy L. Smith, Dunbar, all of W. Va.

[73] Assignee: Union Carbide Corporation, New York, N.Y.

[22] Filed: Jan. 31, 1973

[21] Appl. No.: 328,189

[52] U.S. Cl............. 260/865; 260/75 UA; 260/861; 260/863
[51] Int. Cl.².......................................... C08L 67/06
[58] Field of Search........ 260/861, 865, 863, 75 UA

[56] References Cited
UNITED STATES PATENTS

| | | | |
|---|---|---|---|
| 2,568,331 | 9/1951 | Frilette | 260/40 |
| 3,196,131 | 7/1965 | Mayer et al. | 260/75 |
| 3,219,604 | 11/1965 | Fischer | 260/22 |
| 3,334,155 | 8/1967 | Hopff et al. | 260/861 |
| 3,431,320 | 3/1969 | Baum et al. | 260/865 |
| 3,465,061 | 9/1969 | Fekete et al. | 260/865 |
| 3,538,188 | 11/1970 | Fekete et al. | 260/865 |
| 3,631,217 | 12/1971 | Rabenold | 260/863 |

*Primary Examiner*—Howard E. Schain
*Assistant Examiner*—E. Nielsen
*Attorney, Agent, or Firm*—Aldo John Cozzi

[57] ABSTRACT

The disclosure of this application is directed to unsaturated polyesters which are the condensation reaction products of a mixture of an unsaturated dicarboxylic acid or anhydride thereof, ethylene glycol and diethylene glycol; and to compositions based thereon which have particular utility in sheet molding and bulk molding applications to form thermoset articles of desired configuration.

13 Claims, No Drawings

UNSATURATED POLYESTERS AND COMPOSITIONS BASED THEREON

This invention relates to unsaturated polyesters and to compositions based thereon. More particularly, this invention relates to unsaturated polyesters which are the condensation reaction products of a mixture of an unsaturated dicarboxylic acid or anhydride thereof, ethylene glycol and diethylene glycol; and to compositions based thereon which have particular utility in sheet molding and bulk molding applications to form thermoset articles of desired configuration.

Compositions, based on unsaturated polyesters, have found increased use in sheet molding or bulk molding applications wherein the compositions once formulated, are allowed to B-stage to an acceptable molding viscosity, about 20,000,000 centipoises to about 100,000,000 centipoises, and thereafter molded into shaped articles of desired configuration. In practice, a supplier provides the molder with the desired unsaturated polyester, usually in the form of a styrene or similar monomer solution. The molder then formulates the ultimate molding composition by adding to the unsaturated polyester-monomer solution various additives, which will be described subsequently, including so-called thickeners. Thickeners are materials which serve to decrease the time within which compositions, to which the thickeners have been added, B-stage to an acceptable molding viscosity. Obviously, the more rapidly a composition thickens, the shorter the overall molding cycle and consequently, the lower the cost of the molding operation.

The present invention provides unsaturated polyesters which can be thickened more rapidly than currently known unsaturated polyesters. As a result, the unsaturated polyesters of this invention B-stage to an acceptable molding viscosity in a period of time which is significantly shorter than that of previously known unsaturated polyesters. In addition, the decrease in time within which the unsaturated polyesters of this invention B-stage to an acceptable molding viscosity is achieved without adversely affecting other basic polyester properties. Also, the unsaturated polyesters of this invention maintain a sufficiently "low" viscosity, before B-staging to a molding viscosity, for a period of time sufficient to allow for a complete "wetting out" of glass fibers or other such reinforcing agents with which the polyesters are used in molding applications.

The unsaturated polyesters of this invention are condensation reaction products of a mixture of ethylene glycol, diethylene glycol and an unsaturated dicarboxylic acid or anhydride thereof wherein the amount of ethylene glycol, relative to diethylene glycol, is about 10 to about 90 percent by weight, preferably about 20 to about 80 percent by weight based on the combined weight of the ethylene glycol and diethylene glycol.

The unsaturated polyesters of this invention generally have an average molecular weight of about 500 to about 10,000, preferably about 1,000 to about 6,000, which, based on an acid number, have an acid number of less than about 100.

As previously stated, the "diol" reactant which is condensed with an unsaturated dicarboxylic acid or anhydride thereof is a mixture of ethylene glycol and diethylene glycol. If desired, minor amounts of propylene glycol and/or dipropylene glycol can be tolerated in the reaction mixture without adverse results.

Illustrative of suitable unsaturated dicarboxylic acids which are condensed with the mixture of ethylene glycol and diethylene glycol to produce the unsaturated polyesters of this invention are those having the formula:

Formula I $C_nH_{2n-2}(COOH)_2$ wherein $n$ is an integer having a value of 2 to 20 inclusive, preferably 2 to 10 inclusive. Among such acids can be noted fumaric acid, maleic acid, glutaconic acid, citraconic acid, itaconic acid, ethylidenemalonic acid, mesaconic acid, allylmalonic acid, propylidenemalonic acid, hydromuconic acid, pyrocinchonic acid, allyl succinic acid, carbocaprolactonic acid, teraconic acid, xeronic acids, cetylmalonic acid and other like ethylenically unsaturated acids.

If desired, the acid anhydrides of the acids previously described can be used per se or in admixture with the acids to produce the unsaturated polyesters of this invention.

If desired, aromatic polycarboxylic acids, saturated polycarboxylic acids, anhydrides thereof or monocarboxylic acids can be used, in conjunction with the unsaturated polycarboxylic acids or the anhydrides thereof, to produce the unsaturated polyesters, provided that the condensation reaction mixture contains at least about 50 mole percent of the unsaturated reactant as described.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of 22 carbon atoms, are benzoic acid, hexanoic acid, caprylic acid, lauric acid, caproic acid, myristic acid, palmitic acid, stearic acid, oleic acid, linoleic acid, linolenic acid, ricinoleic acid, hexenoic acid, hexadienoic acid and the like.

Preparation of the unsaturated polyesters can be carried out by methods well known in the art. As a rule, the condensation reaction is conducted by reacting a mixture containing an unsaturated dicarboxylic acid and diol in an amount of about 2 to about 15 percent in molar excess with respect to the "acidic" reactant, at temperatures on the order of about 160° to about 250°C., preferably about 175° to about 225°C., to polyesters having an acid number of less than about 100, generally about 10 to about 60, preferably about 25 to about 50.

As previously stated, the unsaturated polyesters of this invention can be admixed with various additives, including thickeners, to provide compositions which can be used in molding applications.

Among suitable thickeners or thickening agents are the oxides and hydroxides of metals of Groups I, II and IV of the Periodic Table (Handbook of Chemistry and Physics — 50th Edition). Illustrative of specific oxides and hydroxides of the metals noted are the following: magnesium oxide, calcium oxide, zinc oxide, barium oxide, potassium oxide, magnesium hydroxide, calcium hydroxide, titanium oxide, lead oxide and the like.

The thickeners are used in amounts of about 0.5 to about 75 and preferably in amounts of about 1 to about 5 percent by weight based on the weight of the unsaturated polyester.

Illustrative of other additives are the following:

1. A polymerizable ethylenically unsaturated monomer which serves to cross-link the unsaturated polyester to a thermoset product.
2. A peroxide which serves to accelerate the cross-linking reaction.
3. Fillers, including fillers which serve as reinforcing agents.
4. Low profile additives.

Illustrative of suitable polymerizable, ethylenically unsaturated monomers are the vinyl monomers having the formula:

Formula V

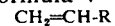

wherein R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, halogenated styrenes such as chlorostyrene, p-iodostyrene, m-fluorostyrene, dichlorostyrene and the like; alkyl substituted styrenes such as p-methyl styrene, p-ethyl styrene, o-tert-butyl styrene and the like; alkoxy and aryloxy substituted styrenes such as p-ethoxy styrene, p-propoxy styrene, p-phenoxy styrene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like; Wherein R is nitrile; acrylonitrile and the like;

Wherein R is amido; acrylamide, bicycloheptylacrylamide, diacetoneacrylamide and the like;

Wherein R is carboxy; acrylic acid and the like;

Wherein R is carbalkoxy; methyl acrylate, butyl acrylate, octylacrylate, lauryl acrylate, cyclohexyl acrylate, phenyl acrylate, benzyl acrylate and the like.

Also suitable is diallyphthalate and the like.

The amount of ethylenically unsaturated monomer used can vary over wide limits. For example, the monomer can be used in amounts of about 10 to about 60 percent by weight based on the combined weight of the monomer and the unsaturated polyester. It is preferred to use about 20 to about 50 percent by weight ethylenically unsaturated monomer, based on the combined weight of the monomer and unsaturated polyester.

Among suitable peroxides that can be used are those which function as free-radical polymerization initiators. Examples of such peroxides are the hydroperoxides such as tert-butyl hydroperoxide, 2,5-dimethylhexane-2,5-dihydroperoxide, cumene hydroperoxide, para-menthane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide, 2,4-dichlorobenzoyl peroxide, lauroyl peroxide and the like.

The amount of peroxide used is sufficient to effect a crosslinking or thermosetting of the composition in a relatively short period of time. As a rule the amount used is about 0.1 to about 5 percent and preferably about 0.5 to about 2 percent by weight, based on the weight of the unsaturated polyester.

Fillers which are commonly employed in polyester compositions include, among others, glass fibers, clay, calcium carbonate, silica, hydrated alumina and the like. These materials are generally used in amounts of about 20 to about 300 percent by weight, based on the weight of the polyester resin.

Examples of suitable low-profile additives, that is, materials designed to insure that there is no undesirable shrinkage in the mold by the composition, to which the low profile material has been added, as the composition is being molded into a thermoset article include, polyvinyl acetate, poly(epsilon caprolactone) copolymers of vinyl acetate and acrylic or methacrylic acid and the like as are further described in U.S. Pat. No. 3,701,748 to C. H. Kroekel patented Oct. 31, 1972, Canadian Pat. No. 887,693 and U.S. Pat. No. 3,718,714 to L. R. Comstock, et al. to be patented Feb. 27, 1973.

Low profile additives are generally used in amounts of about one to about 60 percent by weight based on the weight of the polyester.

The compositions of this invention can be prepared by mixing the components in a suitable apparatus such as a Cowles dissolver, at temperatures on the order of about 23° to about 50°C.

Once formulated, the compositions can be molded into thermoset articles of desired shape such as automobile fenders, dash-boards and the like. The actual molding cycle will, of course, depend upon the exact composition being molded. Suitable molding cycles are conducted at temperatures on the order of about 250° to about 350°F for periods of time ranging from about 0.5 minute to about 5 minutes.

In the examples and controls which are set forth in Table 1, the polyesters and solutions thereof were prepared as follows:

Into a reaction flask equipped with a mechanical stirrer, thermometer, gas-inlet tube and steam condenser, there was charged 2.0 moles of maleic acid anhydride, 1.0 mole of phthalic acid anhydride and 3.15 moles of glycol. The specific glycols used in the preparation of the polyester are noted below. The mixture was heated to a temperature of 200° and maintained at 200°C for the time indicated in Table 1 as "cook time." At the end of the "cook time", the polyester was cooled to a temperature of 150°C and 0.014 percent by weight, based on the weight of the polyester, hydroquinone added thereto. A mixture of equal parts by weight styrene and methyl methacrylate, was then added to the polyester to obtain a solution containing 70 percent by weight solids.

Properties of the polyesters and of the solutions thereof are set forth in Table 1.

The glycols used in the preparation of the polyesters were as follows:

Control 1 — propylene glycol
Control 2 — ethylene glycol
Control 3 — diethylene glycol
Example 1 — 90 percent by weight ethylene glycol
   10 percent by weight diethylene glycol
Example 2 — 80 percent by weight ethylene glycol
   20 percent by weight diethylene glycol
Example 3 — 70 percent by weight ethylene glycol
   30 percent by weight diethylene glycol
Example 4 — 60 percent by weight ethylene glycol
   40 percent by weight diethylene glycol
Example 5 — 50 percent by weight ethylene glycol
   50 percent by weight diethylene glycol
Example 6 — 40 percent by weight ethylene glycol
   60 percent by weight diethylene glycol

TABLE I

| | Control 1* | Control 2 | Control 3 | Ex. 1 | Ex. 2 | Ex. 3 | Ex. 4 | Ex. 5 | Ex. 6 |
|---|---|---|---|---|---|---|---|---|---|
| Cook Time in Hours | 6.5 | 4.5 | 5.75 | 4.8 | 5.5 | 5.5 | 5.3 | 4.5 | 5.0 |
| Acid Number of Polyester | 31 | 28 | 19 | 26 | 19 | 26 | 18 | 29 | 20 |
| Properties of Polyester-Styrene-Methyl-Methacrylate Solution | | | | | | | | | |
| Viscosity, cps. at 25°C | 159 | 170 | 260 | 192 | 208 | 138 | 210 | 209 | 150 |
| Gel Time, Min/Sec. | 3/45 | 3/45 | 4/40 | 2/40 | 3/5 | 3/15 | 3/2 | 2/53 | 3/0 |
| Peak Exotherm, °C | 234 | 237 | 214 | 238 | 240 | 237 | 238 | 239 | 230 |
| Peak Time, Min/Sec. | 6/18 | 4/5 | 9/23 | 4/40 | 5/13 | 5/26 | 4/57 | 4/37 | 5/22 |
| Specific Gravity | 1.126 | 1.143 | 1.116 | 1.154 | 1.148 | 1.144 | 1.143 | 1.144 | 1.148 |

*In producing Control 1, 3.3 moles of propylene glycol were used

Polyester solutions noted in Table I and throughout this specification were cured by adding thereto 1.0 percent by weight benzoyl peroxide, based on the weight of the polyester solutions, casting the resultant compositions into one-eighth of an inch plaques and subjecting the plaques to the following heating cycle:

2 hours at a temperature of 60°C
3 hours at a temperature of 125°C

Properties of the cured compositions are set forth in Table II.

TABLE II

| | Control 1 | Control 2 | Control 3 | Ex. 1 | Ex. 2 | Ex. 3 | Ex. 4 | Ex. 5 | Ex. 6 |
|---|---|---|---|---|---|---|---|---|---|
| Heat Distortion Temperature, °C | 79 | 82 | 15 | 81 | 82 | 78 | 74 | 74 | 70 |
| Tensile Strength, psi | 9,900 | 11,000 | 2,410 | 11,100 | 11,500 | 10,900 | 11,250 | 11,700 | 11,100 |
| Elongation, percent | 2.2 | 2.2 | 51 | 2.5 | 2.9 | 3.0 | 4.4 | 4.7 | 3.8 |
| Modulus of Elasticity | 5.17 | 6.01 | 0.644 | 6.06 | 5.80 | 5.55 | 5.31 | 5.61 | 5.16 |
| Weight Loss After 24 Hours at a Temperature of 225°C, In Percent | 14.65 | 8.60 | 17.21 | 8.87 | 6.60 | 9.21 | 8.55 | 8.08 | 9.15 |
| Barcol Hardness (a35) | 86 | 89 | 61 | 89 | 90 | 89 | 90 | 90 | 89 |

Tensile strength determinations noted in this specification were carried out according to the procedure described in ASTM Test 638-64T.

Elongation determinations noted in this specification were carried out according to the procedure described in ASTM Test 638-64T.

Modulus determinations noted in this specification were carried out according to the procedure described in ASTM Test 790-66.

Heat Distortion temperature determinations noted in this specification were carried out according to the procedure described in ASTM D-648-56.

Gel Time determinations including gel time, exotherm temperature and peak time noted in this specification were carried out according to the standard tests of the Society of the Plastics Industry.

In the Examples and Controls set forth in Table III, styrene per se was used to formulate the solutions of the polyesters. These solutions contained 30 percent by weight styrene.

The polyester and styrene solutions thereof were prepared as described for the polyesters and solutions of Table I, using the reactants noted below in the preparation of the polyester.

Example 7 — 3 moles of maleic acid anhydride
  1 mole of o-phthalic acid anhydride
  4.2 moles of a mixture containing 30 percent by weight ethylene glycol and 70 percent by weight diethylene glycol Example 8 — 3 moles of maleic acid anhydride
  1 mole of o-phthalic acid anhydride
  0.88 mole of propylene glycol
  2.35 moles of ethylene glycol
  1.01 moles of diethylene glycol Control 4 — 3 moles of maleic acid anhydride
  1 mole of o-phthalic acid anhydride
  4.4 moles of propylene glycol Properties of the polyester-styrene solutions and cured products thereof are set forth in Table III.

TABLE III

| Properties of Styrene-Polyester Solution | Control 4 | Ex. 7 | Ex. 8 |
|---|---|---|---|
| Acid Number | 22 | 19 | 20 |
| Viscosity, cps (25°C) | 2,150 | 1,540 | 2,320 |
| Color, Pt-Co (Colormetric Test) | 35 | 30 | 30 |
| SPI Gel Time (Min/Sec) | 3/15 | 2/50 | 2/35 |
| Peak Exotherm, °C | 232 | 241 | 243 |
| Peak Time (Min/Sec) | 5/30 | 4/22 | 4/00 |
| Properties of Cured Styrene-Polyester Solution | | | |
| Heat Distortion Temperature, (°C) | 117 | 80 | 110 |
| Tensile Strength (psi) | 9,400 | 10,200 | 10,700 |
| Elongation, (%) | 2.4 | 4.5 | 3.3 |
| Flexural Strength (psi) | 14,360 | 18,650 | 19,740 |
| Flexural Modulus (psi $\times 10^5$) | 5.83 | 5.07 | 5.12 |
| Barcol Hardness (935) | 87 | 85 | 87 |
| Water Resistance (24-hr.boil) Weight Gain % | 3.0 | 3.6 | 3.8 |

TABLE III-continued

| Properties of Styrene-Polyester Solution | Control 4 | Ex. 7 | Ex. 8 |
|---|---|---|---|
| Flexural Strength (psi) | 4,450 | 8,060 | 6,810 |
| Retention (%) | 31.9 | 43.2 | 34.5 |
| Flexural Modulus (psi × $10^5$) | 3.24 | 2.30 | 2.62 |
| Retention (%) | 55.6 | 51.2 | 51.1 |
| Weight Loss, % after 24 hours at 225°C | 13.65 | 5.54 | 8.05 |

Tests under Water Resistance were determined using two test specimens, 1 inch by 3 inches, cut from panels which were molded as described previously. The edges of each test specimen were sanded until smooth and the specimens were then preconditioned for 1 hour at a temperature of 100°C. The preconditioned specimens were cooled to room temperature, about 23°C, in a desiccator and weighed. After being weighed, the specimens were immersed in distilled water, which was at boiling temperature, for 24 hours. At the end of the 24-hour period, the specimens were wiped dry with lint-free paper and reweighed. Water resistance expressed in terms of percent, was the average gain in weight of the two samples. Specimens were then used to conduct other tests noted.

The thickening rates of the polyesters of this invention were determined by measuring the viscosities of compositions based thereof at different time levels after formulation. The viscosity measurements were made at 90°F using an HBT Brookfield viscometer.

The actual compositions tested and results thereof are noted in the Examples which follow, wherein amounts are in grams.

| Formulation | EXAMPLE 9 Control Composition 1 | Composition A |
|---|---|---|
| Polyester-Styrene Solution of Example 8 | — | 150 |
| Polyester-Styrene Solution of Control 4 | 150 | — |
| Low Profile Additive | 75 | 75 |
| Calcium Carbonate | 300 | 300 |
| Magnesium Hydroxide | 9 | 9 |
| Thickening Rates | Viscosity - Centipoises - In Thousands | |
| 1 hour | 112 | 114 |
| 3 hours | 141 | 229 |
| 5 hours | 228 | 548 |
| 24 hours | 2,138 | 6,330 |
| 48 hours | 7,600 | 16,810 |
| 96 hours | 22,910 | 36,000 |
| 10 days | 62,000 | 65,500 |

The low profile additive of this example was a thermoplastic copolymer of vinyl acetate and acrylic acid containing 0.8 percent by weight combined acrylic acid. The low profile additive was used as a styrene solution containing 60 percent by weight styrene.

| Formulation | EXAMPLE 10 Control Comp. 2 | Control Comp. 3 | Comp. B | Comp. C |
|---|---|---|---|---|
| Polyester-Styrene Solution (Described below under Two-Stage Process) | — | — | 200 | — |
| Polyester-Styrene Solution of Example 7 | — | — | — | 200 |
| Polyester-Styrene Solution of Control 4 | 200 | — | — | — |
| Polyester-Styrene Solution of Control 5 | — | 200 | — | — |
| Calcium Carbonate | 300 | 300 | 300 | 300 |
| Calcium Hydroxide | 9 | 9 | 9 | 9 |
| | Viscosity - Centipoises - In Thousands | | | |
| After 4 hours | — | 12 | 36.5 | — |
| After 5 hours | 73 | — | — | 447 |

TWO-STAGE PROCESS

Into a 5-liter, 4-neck, round-bottomed flask equipped with a thermometer, mechanical stirrer, nitrogen sparge, and a multiple condenser apparatus consisting of a glass helices-packed column topped by a steam jacketed condenser and a goose-neck water condenser leading to a tared receiver, there was charged 5 moles of isophthalic acid and 21 moles of a 30/70 mole percent mixture of ethylene glycol and diethylene glycol. The resultant mixture was heated until reaction was indicated by the appearance of a distillate. The reaction was continued to an acid number of about 15, with the reaction temperature being maintained at 200°C. The reaction mixture was cooled to approximately 150°C. and 15.0 moles of maleic anhydride were then added. The temperature was increased to 200°C. and maintained at 200°–210°C. until the acid number was about 40. The solution was cooled to about 150°C. and 0.014 percent by weight hydroquinone was added based on the weight of the polyester. Cooling was continued to about 120°C. and sufficient styrene monomer was added to produce a solution containing 35 percent by weight styrene.

Polyester-styrene solution of Control 5 was prepared as described for the polyesters and solutions of Table III, using the reactants noted below, in preparation of the polyester.

Control 5 — 3 moles of maleic acid anhydride
1 mole of isophthalic acid anhydride
4.6 moles of propylene glycol
Acid number of polyester = 36
Viscosity of polyester-styrene
Solution in Centipoises = 1800

EXAMPLE II

| Formulation | Control Composition 4 | Composition D |
|---|---|---|
| Polyester-Styrene Solution | — | 200 |
| Calcium Carbonate | 300 | 300 |
| Calcium Hydroxide | 9 | 9 |
| Thickening Rates | Viscosity - Centipoises - In Thousands | |
| After 1 hour | 17.6 | 16.0 |
| 24 hours | 160 | 174.5 |
| 48 hours | 216 | 234 |
| 72 hours | 665 | 1106 |
| 120 hours | 1870 | 3230 |

Polyester-styrene solution of this Example and of Control 6 were prepared as described for the polyesters and solutions of Table III; using the reactants noted below, in the preparation of the polyester.

Polyester of Example 11
1.0 mole of maleic acid anhydride
0.42 mole of ethylene glycol
0.63 mole of diethylene glycol
Acid number of polyester = 15
Viscosity of polyester-styrene
Solution in Centipoises = 1120

It is to be noted that the disclosure of all patents noted herein is incorporated herein by reference.

What is claimed is:

1. A composition comprising an unsaturated polyester which is the condensation product of a reaction mixture consisting essentially of ethylene glycol, diethylene glycol and an unsaturated dicarboxylic acid or anhydride thereof or mixtures of said acid and anhydride wherein the ethylene glycol is present in an amount of about 10 to about 90 percent by weight based on the combined weight of ethylene glycol and diethylene glycol, a polymerizable ethylenically unsaturated monomer in an amount of about 10 to about 60 percent by weight based on the combined weight of said monomer and said polyester, a Group II metal oxide or hydroxide thickener in an amount of about 0.5 to about 75 percent by weight based on the weight of said polyester.

2. The composition as defined in claim 1 wherein the ethylene glycol of the reaction mixture is present in an amount of about 20 to about 80 percent by weight based on the combined weight of ethylene glycol and diethylene glycol.

3. The composition as defined in claim 1 wherein the unsaturated dicarboxylic acid of the polyester has the formula

$C_nH_{2n-2}(COOH)_2$ wherein $n$ is an integer having a value of 2 to 20 inclusive.

4. The composition as defined in claim 3 wherein $n$ is an integer having a value of 2 to 10 inclusive.

5. The composition as defined in claim 4 wherein the unsaturated dicarboxylic acid is maleic acid.

6. The composition as defined in claim 1 wherein the anhydride of the unsaturated polyester is the anhydride of maleic acid.

7. The composition as defined in claim 1 wherein a phthalic acid is present in the reaction mixture.

8. The composition as defined in claim 1 wherein a phthalic acid and maleic acid anhydride are present in the reaction mixture 9. A composition as defined in claim 1 wherein: the ethylenically unsaturated monomer is present in an amount of about 20 to about 50 percent by weight based on the combined weight of said monomer and said polyester and the Group II metal oxide or hydroxide is present in an amount of about 1 to about 5 percent by weight based on the weight of said polyester.

10. A composition as defined in claim 9 wherein the thickener is calcium hydroxide.

11. A composition as defined in claim 9 wherein the ethylenically unsaturated monomer is a vinyl monomer.

12. A composition as defined in claim 11 wherein the vinyl monomer is styrene.

13. The cured product of the composition defined in claim 9.

* * * * *

UNITED STATES PATENT OFFICE
CERTIFICATE OF CORRECTION

Patent No. 3,923,928　　　　　　　　Dated January 16, 1976

Inventor(s) K. E. Atkins, M. A. Harpold and P. L. Smith

It is certified that error appears in the above-identified patent and that said Letters Patent are hereby corrected as shown below:

Column 5, Table II, "(a35)" should read -- (935) --.

Column 9, "Example II" should read -- Example 11 --.

Signed and Sealed this eighteenth Day of May 1976

[SEAL]

Attest:

RUTH C. MASON
*Attesting Officer*

C. MARSHALL DANN
*Commissioner of Patents and Trademarks*